(12) United States Patent
Kolipaka

(10) Patent No.: US 9,967,699 B1
(45) Date of Patent: May 8, 2018

(54) LOCATION DECLARING CALLER TUNE AUDIBLE ON CALLER PHONE

(71) Applicant: Amazon Technologies, Inc., Reno, NV (US)

(72) Inventor: Laxman Kasyap Kolipaka, Andhra Pradesh (IN)

(73) Assignee: Amazon Technologies, Inc., Reno, NV (US)

(*) Notice: Subject to any disclaimer, the term of this patent is extended or adjusted under 35 U.S.C. 154(b) by 218 days.

(21) Appl. No.: 13/784,563

(22) Filed: Mar. 4, 2013

(51) Int. Cl.
*H04M 1/66* (2006.01)
*H04W 4/02* (2018.01)

(52) U.S. Cl.
CPC .................................... *H04W 4/02* (2013.01)

(58) Field of Classification Search
CPC ....... H04M 1/70; H04M 3/16; H04M 2203/60
See application file for complete search history.

(56) References Cited

U.S. PATENT DOCUMENTS

| | | | | |
|---|---|---|---|---|
| 5,963,866 A | * | 10/1999 | Palamara et al. | 455/456.5 |
| 2006/0291640 A1 | * | 12/2006 | Nagesh et al. | 379/211.02 |
| 2008/0214206 A1 | * | 9/2008 | Shimanuki et al. | 455/456.1 |
| 2009/0028301 A1 | * | 1/2009 | Ma et al. | 379/87 |
| 2009/0149192 A1 | * | 6/2009 | Vargas et al. | 455/456.1 |
| 2010/0130178 A1 | * | 5/2010 | Bennett et al. | 455/414.1 |
| 2011/0244887 A1 | * | 10/2011 | Dupray et al. | 455/456.2 |
| 2013/0143589 A1 | * | 6/2013 | Huang | 455/456.1 |

* cited by examiner

*Primary Examiner* — Keith Fang
(74) *Attorney, Agent, or Firm* — Lowenstein Sandler LLP

(57) ABSTRACT

A telecommunication system receives a request from a caller phone to establish a telecommunication call with a recipient phone. The telecommunication system determines whether the caller phone is authorized to receive location information related to a current geographic location of the recipient phone and upon determining that the caller phone is authorized to receive location information, obtains information about a current geographic location of the recipient phone. Upon establishing at least an initial communication with the recipient phone, the telecommunication system causes the information about the current geographic location of the recipient phone to be audibly included in a caller tune to the caller phone if the caller phone is authorized to receive location information, wherein the caller tune is indicative of the recipient phone ringing in response to the request from the caller phone.

12 Claims, 6 Drawing Sheets

LOCATION DECLARING CALLER TUNE AUDIBLE ON CALLER PHONE

BACKGROUND

A large and growing population of users carry various phone capable mobile devices, such as cellular telephones, smart phones, and the like. When a user's phone capable mobile device is lost, stolen, or lent to another person, the user may want to determine a location of the phone to locate and possibly retrieve the phone.

BRIEF DESCRIPTION OF DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
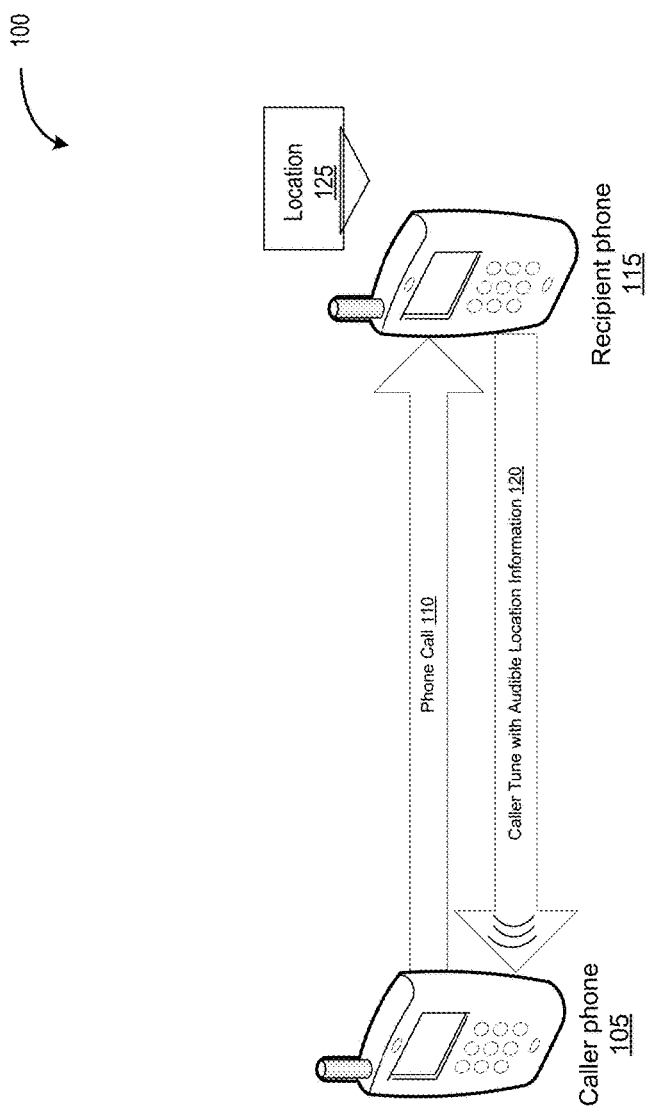
FIG. 1 is a diagram illustrating an example network architecture in which embodiments of the disclosure may operate.

When a caller calls a user, the caller hears an audible feedback caller tune that indicates that the user's mobile device is ringing. When a user's mobile device is lost, stolen, or lent to someone, the user may want to know the location of the user's mobile device. Moreover, a user may want to know the geographic location of her child when the child is in a different location than the user.

Embodiments of a method and apparatus are described for audibly providing the geographic location information of a user's mobile device in an audible feedback caller tune, also referred to as a ringback tone. The feedback caller tune indicates that a first mobile device is ringing in response to a call received from a second mobile device. A user, or a person that the user has designated/authorized, can use a caller mobile device to call a recipient mobile device. If the recipient mobile device is authorized to receive location information related to a current geographic location of the recipient phone, information about the current geographic location of the recipient mobile device will be audibly included in the feedback caller tune to the caller mobile device. The user will then know the current geographic location of the recipient mobile device, such as the Global Positioning System (GPS) location of the recipient mobile device and can locate the recipient mobile device if it is lost or stolen.

Furthermore, embodiments of a method and apparatus are described for provided for allowing a user to keep track of her child when the child is in a different location than the user. The user, the child, and possibly other family members may be part of a mobile phone group plan, such as a family plan. The user, as the account owner of the family plan, can selectively turn on a geo caller tune feature on the family plan. The user can designate herself, as well as other members of the family plan (e.g., user's spouse, user's oldest child, etc.) as authorized users of the geo caller tune feature. The geo caller tune feature can cause the geographic location of the child's phone to be audibly included as part of the caller tune whenever one of the authorized users calls the child's phone. This allows the user (and any other authorized users) to quickly and routinely check on and verify the location of her child simply by calling her child's mobile device.

For example, a mother, a father, and two children are part of a family plan. The mother is the account owner and designates herself and the father as authorized users of the geo caller tune feature for their children. Each time the mother calls one of her children's mobile devices, the mother will hear the audible geographic location of the child's phone included in the caller tune once a connection is established with the child's phone. Each time the father calls one of his children's mobile devices, the father will hear the audible geographic location of the child's phone included in the caller tune once a connection is established with the child's phone.

When the user's mobile device is turned off, does not have a connection to a cell phone tower, or otherwise cannot obtain its current geographic location, embodiments of a method and apparatus can record the last recorded geographic location for the user's mobile device and include the last recorded geographic location as part of the caller tune. Therefore, instead of a caller not receiving any caller tune and/or being routed directly to a voicemail of the user's mobile device, the caller can hear the last recorded geographic location of the user's mobile device. Once the last recorded geographic location of the user's mobile device is sent as part of the caller tune, the caller can be directed to the voicemail of the user's mobile device.

For example, if a user loses his mobile device and the battery of the user's mobile device drains and the mobile device turns off, the user can still hear the last recorded geographic location of the user's mobile device when the user calls the user's mobile device. The user can hear the last recorded geographic location of the user's mobile device and go to the last recorded geographic location to try to locate the phone.

FIG. 1 is a diagram of an example of a network architecture 100, in which embodiments of the present invention described herein may operate. The network architecture 100 may include a caller phone 105 and a recipient phone 110. The caller phone 105 can transmit a request for a phone call 110 to the recipient phone 115. Once at least an initial connection has been established between the caller phone 105 and the recipient phone 115, the caller phone 105 can receive, as part of caller tune 120, the location 125 of the recipient phone 115.

A caller tune may also be referred to as a ringback tone, ringing tone, etc. The caller tune 120 is an audible indication that is heard on the telephone line by the caller phone 105 while the recipient phone 115 is being rung. The caller tune 120 can be a repeated tone, designed to assure the caller phone 105 that the recipient phone 115 is ringing. The caller tune 120 heard by the caller phone 105 can be customized by the recipient phone 115. In some countries, a user of the recipient phone 115 can customize the caller tune 120 that is sent as a feedback of ringing to the caller phone 105. For example, the user of the recipient phone 115 selects his favorite song to play in place of the typical ringing sent to a caller phone 105, such that a user of the caller phone 105 hears the favorite song instead of typical ringing. In some examples, the recipient phone 115 can further customize the caller tune 120 by assigning a different tune, musical note, etc. based on the identity of the caller phone 105. For example, a man can customize the caller tune 120 heard by his wife when she calls him to be a love song, the caller tune 120 heard by his son when he calls him to be a his son's favorite song, the caller tune 120 heard by his mother when she calls him to be the musical note "G", etc. In some instances, the caller tune 120 that is sent to the caller phone 105 is the same tune that is played to a user of the recipient phone 115 as the audible alert of an incoming call.

If the caller phone 105 is an authorized recipient of the location 125 of the recipient phone 115, the caller tune 120 sent to the caller phone 105 can be customized to include the location 125 of the recipient phone 115. For example, if caller phone 105 places a phone call 110 to recipient phone 115, and recipient phone 115 has a location 125 of 1234 Elm Street, City X, State Y, Country Z, the caller tune 120 sent to the caller phone 105 will audibly include the location 125 of 1234 Elm Street, City X, State Y, Country Z. In this example, a user of the caller phone 105 will hear a caller tune 120 with audible location information audibly reciting 1234 Elm Street, City X, State Y, Country Z.

In some embodiments, a user (e.g., owner) of the recipient phone 115 can contact a service provider of the recipient phone 115 (e.g., AT&T®, T-Mobile®, Verizon®, etc.) to indicate that the recipient phone 115 has been stolen or lost. Once the service provider has received the indication, the caller tune 120 can include the location 125 of the recipient phone 115.

In some embodiments, the caller tune 120 audibly including the information about the location 125 of the recipient phone 115 will only be provided to authorized users. For example, a user of the recipient phone 115 can provide a list of phone numbers that are authorized to receive the location 125 of the recipient phone 115. For example, a user provides the phone number of the user's wife, the user's parents, and the user's brother as the authorized numbers to receive the location information. In this example, the caller tune 120 will only audibly include the location 125 if the caller phone 105 belongs to the user's wife, the user's parents, and/or the user's brother. If the caller phone 105 belongs to the user's coworker, the caller tune 120 will not audibly include the location 125 to the caller phone 105.

In some embodiments, the caller tune 120 will audibly include the location 125 to authorized callers if the user of the recipient phone 115 has indicated that the recipient phone 115 is lost, stolen, or otherwise needs to located. In some embodiments, the caller tune 120 will audibly include the location 125 if the caller phone 105 belongs to a parent, and the recipient phone 115 belongs to a child of the parent.

In some embodiments, the caller tune 120 will audibly include the location 125 if the caller phone 105 provides a verification code (e.g., passcode) to the recipient phone 115 along with to the phone number of the recipient phone 115. For example, a user of caller phone 105 enters the phone number corresponding to the recipient phone 115 (e.g., 123-456-7890) followed by a verification code, such as "1234". This verification code authorizes the caller phone 105 to receive the location 125 of the recipient phone 115 as part of the caller tune 120.

Figure 2:
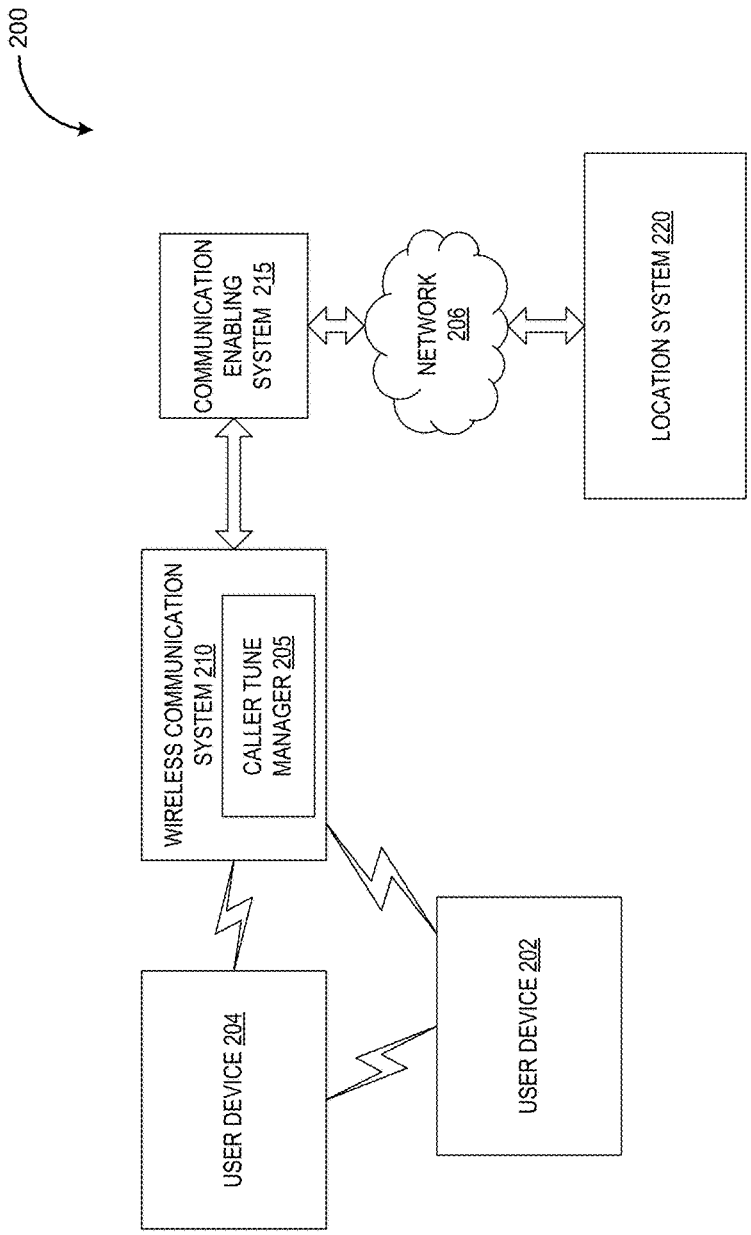
FIG. 2 is a block diagram illustrating another example network architecture in which embodiments of the disclosure may operate.

FIG. 2 is a block diagram of an example of a network architecture 200, in which embodiments of the present disclosure described herein may operate. The network architecture 200 may include a location system 220 and one or more user devices (e.g., mobile devices) 202, 204 capable of communicating with the location system 220 via a network 206. Network 206 may include, for example, any combination of a public network such as the Internet, a wireless network (e.g., an 802.11n network, an 802.11a network, etc.), a cellular network (e.g., an Long Term Evolution (LTE) network, a Code Division Multiple Access (CDMA) network, etc.) and a private network such as a local area network (LAN).

The user devices 202, 204 may be portable computing devices that are capable of generating or receiving a caller tune, such as cellular telephones, smart phones, personal digital assistants (PDAs), netbooks, laptop computers, and the like. The user devices 202, 204 may also be non-portable computing devices that are capable of generating or receiving a caller tune, such as a desktop computer, and so on. The user devices 202, 204 are variously configured with different features to enable generating a caller tune or receiving a caller tune from the user devices 202, 204.

The location system 220 may provide location information. The location system 220 may include a network-accessible server-based functionality, various data stores (not shown), and/or other data processing equipment. The location system 220 may be implemented by a single machine or a cluster of machines. The location system 220 may include one or more machines (e.g., one or more server computer systems, routers, gateways, etc.) that have processing and storage capabilities to provide the server-based functionality.

In one embodiment, the location system 220 corresponds to an entity which provides location information (e.g., longitude, latitude, address, nearby landmarks, etc.) to a user device upon a request for the location information. For example, the location system 220 can be a GPS system, a Global Navigation System (GNS), a Location Referencing System, a system that can perform cell phone tower triangulation, a system that can obtain and use an Internet Protocol (IP) address to determine a location, a system that can triangulate a location by scanning for available WiFi networks and comparing the available WiFi networks to a list of known WiFi networks and their locations, or any other system that can provide location information of a mobile device.

The location system 220 may deliver, and the user devices 202, 204, receive, location information and/or other information via the network 206. For example, the user devices 202, 204 may download or receive location information from the location system 220. The location system 220 may also receive various requests (e.g., location requests), instructions and other data from the user devices 202, 204 via the network 206.

Communication between the user devices 202, 204 and the location system 220 may be enabled via any communication infrastructure. One example of such an infrastructure includes a combination of a local area network (LAN), a wide area network (WAN), and wireless infrastructure, which allows a user to use the user device 204 to obtain (e.g., download) the location information of the user device 204 without being tethered to the location system 220 via hardwired links. The wireless infrastructure may be provided by one or multiple wireless communications systems, such as wireless communication system 210. The wireless infrastructure may be provided by one or multiple wireless communications systems, such as wireless communication system 210. In one embodiment, the wireless communication system 210 may be a wireless fidelity hotspot connected with the network 206. In one embodiment, the wireless communication system 210 may be a wireless LAN based on IEEE 802.11x standards. For example, the wireless communication system 210 may use an 802.11a, 802.11b, 802.11c, 802.11g, 802.11n, or 802.11ac communication protocol. In another embodiment, the wireless communication system 210 may be a cellular communication system (e.g., an LTE system, a CDMA system, and HSPA+ system etc.). In a further embodiment, the wireless communication system 210 may use any number or combination of wireless communication protocols. The wireless communication system 210 may also be a wireless carrier system that can be implemented using various data processing equipment, communication towers, etc. Alternatively, or in addition, the wireless carrier system may rely on satellite technology (e.g., GPS satellites) to exchange information with the user devices 202, 204.

The communication infrastructure may also include a communication-enabling system 215 that serves as an intermediary in passing information between the location system 220 and the wireless communication system 210. The communication-enabling system 215 may communicate with the wireless communication system 210 (e.g., a wireless carrier) via a dedicated channel, and may communicate with the location system 220 via a non-dedicated communication mechanism, (e.g., a public Wide Area Network (WAN) such as the Internet).

In addition to wirelessly connecting to wireless communication system 210, user devices 202, 204 may also wirelessly connect to other user devices 202, 204. For example, user device 202 may form a wireless ad hoc (peer-to-peer) network with user device 204 using WiFi, Bluetooth, cellular communication protocols (e.g., LTE, HSPA+, etc.), or other wireless communication protocols.

The wireless communication system 210 may include a caller tune manager 205. In one embodiment, the caller tune manager 205 may receive a request, such as a phone call, from a user device 202 to establish a telecommunication call with user device 204. In response to receiving the request from the user device 202, the caller tune manager 205 can determine whether the user device 202 is authorized to receive location information related to a current geographic location of the user device 204. If the user device 202 is authorized to receive the location information, the caller tune manager 205 can obtain information about a current geographic location of the user device 204. In one embodiment, the wireless communication system 210 obtains the information about the current geographic location of the user device 204 by sending a request to the user device 204 for its location. The user device 204 may communicate with the location system 220 to obtain location information of the user device 204 in response to the request from the wireless communication system 210. In another embodiment, the wireless communication system 210 obtains the information about the current geographic location of the user device 204 directly by sending a request for the location information from the location system 220. In another alternate embodiment, if the wireless communication system 210 cannot obtain location information from the location system 220 or the user device 204 (e.g., because the user device 204 is turned off, the user device 204 does not have a connection to the wireless communication system 210, etc.), the wireless communication system 210 obtains a last recorded location of the user device 204 (e.g., stored in a memory associated with the caller tune manager 205). Once the wireless communication system 210 has obtained the location information, the wireless communication system 210 can establish an initial communication with the user device 204, and the caller tune manager 205 can cause the location information of the user device 204 to be audibly included in a caller tune to the user device 202.

Figure 3:
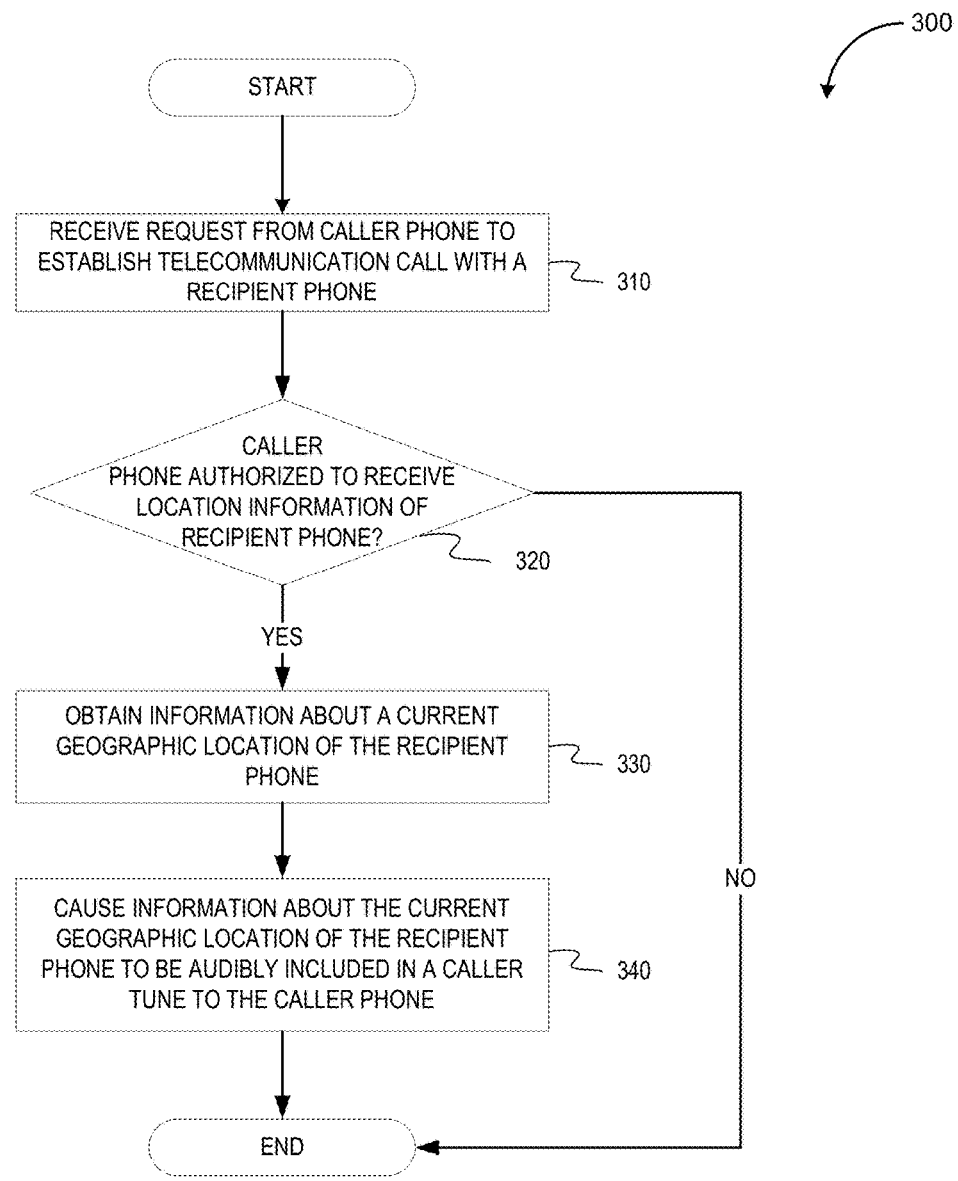
FIG. 3 is a flow diagram illustrating a method of providing a location declaring caller tune, according to one embodiment.

FIG. 3 is a flow diagram illustrating a method of providing a location declaring caller tune, according to one embodiment. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 300 may be performed by a wireless communication, such as wireless communication system 210 illustrated in FIG. 2.

Referring to FIG. 3, the method 300 begins at block 310 where processing logic receives a request from a caller phone to establish a telecommunication call with a recipient phone. In one embodiment, the request is a telephone call placed by the caller phone the recipient phone. In an alternate embodiment, the request is a message (e.g., text, electronic, etc.) sent from the caller phone. In another alternate embodiment, the request is a telephone call or trigger received from a service provider (e.g., cell phone provider, service provider, etc.). In one embodiment, the request includes identification information associated with the caller phone. For example, the identification information can be a telephone number of the caller phone, an owner of the caller phone, a service provider of the caller phone, etc. In one embodiment, the request includes a verification code. The verification code (e.g., passcode) can be a predetermined sequence of numbers, letters, keys, or other information that authorizes the caller phone to receive location information associated with the recipient phone. In one embodiment, the verification code is entered prior to a user of the caller phone dialing the telephone number of the recipient phone. In an alternate embodiment, the verification code is entered by a user of the caller phone after dialing the telephone number of the recipient phone.

At block 320, processing logic determines whether the caller phone is authorized to receive location information of the recipient phone. If processing logic determines that the caller phone is authorized to receive location information of the recipient phone, the method 300 proceeds to block 330. If processing logic determines that the caller phone is not authorized to receive location information of the recipient phone, the method 300 ends.

In one embodiment, processing logic determines whether the caller phone is authorized to receive location information of the recipient phone based on a verification code provided in association with the request to establish the telecommunication call with the recipient phone. For example, the verification code can be provided by a user of the caller phone before or after the user dials a phone number associated with the recipient phone. If the verification code provided in association with the request matches a predefined verification code associated with the recipient phone, processing logic determines that the caller phone is authorized to receive location information of the recipient phone. In one embodiment, if the verification code provided in association with the request does not match a predefined verification code associated with the recipient phone, processing logic determines that the caller phone is not authorized to receive location information of the recipient phone. For example, if the verification code provided by the caller phone is "1234" and the predefined verification code is "1234", the caller phone will be authorized to receive location information of the recipient phone. If the verification code provided by the caller phone is "2345", the caller phone will not be authorized to receive location information of the recipient phone.

In an alternate embodiment, processing logic determines whether the caller phone is authorized to receive location information of the recipient phone based on whether the caller phone is registered as an authorized user associated with the recipient phone The caller phone can be registered as an authorized user by a user of the recipient phone with a telecommunications carrier associated with the recipient phone. For example, a user of the recipient phone can authorize his wife as an authorized user by listing her on his cell phone account with his telecommunications carrier (e.g., wireless provider). If the caller phone is registered as an authorized user to receive the location information, processing logic can determine that the caller phone is authorized to receive location information of the recipient phone. If the caller phone is not registered as an authorized user to receive the location information, processing logic can determine that the caller phone is not authorized to receive location information of the recipient phone. Processing logic can determine whether the caller phone is registered as an authorized user by comparing identification information of the caller phone to predefined authorized users associated with the recipient phone (e.g., a list of authorized users, members of a group account, etc.). The identification information can be a telephone number of the caller phone, an owner of the caller phone, a service provider of the caller phone, etc. For example, a user of the recipient phone registers authorized users for her phone as telephone numbers 123-456-7890 and 456-123-7890. In this example, if the caller phone is identified by telephone number 789-123-4567, processing logic will determine that the caller phone is not authorized to receive location information because the telephone number 789-123-4567 does not match 123-456-7890 or 456-123-7890, which are authorized.

In another embodiment, processing logic determines whether the caller phone is authorized to receive location information of the recipient phone based on a trigger (e.g., geo caller tune feature) set via a site of a service provider (e.g., AT&T®, T-Mobile®, Verizon®, etc.) of the recipient device. The trigger set via the site of the service provider can be set by a user of the recipient phone (e.g., the owner of the phone, etc.), by an operator of the service provider (e.g., a customer service representative of the service provider, etc.), etc. The site can be a website of the service provider, a mobile phone application provided by the service provider, etc. For example, if a mobile phone of a user A is stolen, the user A can go to the site operated by the service provider and the user A indicate via the site that the mobile phone was stolen to cause the trigger to be set. The user can indicate that the mobile phone was stolen via the website by clicking a predefined link on the website, by submitting the information via a graphical user interface provided on the website, by entering the information into the mobile phone application, etc. In another example, if a mobile phone of user A is stolen, the user A can go to website operated by the service provider and the user A can contact an online customer service representative and provide the stolen information to the online customer service representative. In this example, the online customer service representative can set the trigger for the mobile device via the site of the service provider. If the trigger is set, processing logic can determine that the caller phone is authorized to receive location information of the recipient phone. If the trigger is not set, processing logic can determine that the caller phone is not authorized to receive location information of the recipient phone.

In another alternate embodiment, processing logic determines whether the caller phone is authorized to receive location information of the recipient phone based on a lost status of the recipient phone. For example, the lost status can be set by an operator of the service provider of the recipient phone, such as by a customer service representative of the service provider, etc., in response to a telephone call or message received by the service provider from a user of the recipient phone. In another example, the lost status can be set by the recipient phone in response to receiving an indication that the recipient phone has been lost. If the lost status is set for the recipient phone, processing logic can determine that the caller phone is authorized to receive location information of the recipient phone. If the lost status is not set for the recipient phone, processing logic can determine that the caller phone is not authorized to receive location information of the recipient phone.

In yet another alternate embodiment, processing logic determines whether the caller phone is authorized to receive location information of the recipient phone based on a number of passcodes that have been attempted as input to the recipient phone. For example, in order to try to unlock the recipient phone, a user may have to enter in a passcode in the phone. In some embodiments, if a user has inputted a passcode incorrectly multiple times to try to unlock the recipient phone, the recipient phone can set a trigger. Upon establishing a communication with the recipient phone, processing logic can determine if the trigger is set and if the trigger is set on the recipient phone (e.g., processing logic can send a request to the recipient phone to provide a value of the trigger), processing logic can determine that the caller phone is authorized to receive location information of the recipient phone. For example, if a recipient phone is stolen, and the thief of the phone enters 3 incorrect passcodes to the recipient phone, the recipient phone sets the audible location trigger. In this example, when processing logic establishes a connection with the recipient phone, processing logic request the audible location trigger and determines that the audible location trigger is set. Processing logic determines that any caller phone is authorized to receive location information of the recipient phone because the recipient phone is lost or stolen.

In an additional alternate embodiment, processing logic determines whether the caller phone is authorized to receive location information of the recipient phone based on a time parameter. In this embodiment, if the recipient phone has not been used for a predefined amount of time (e.g., 1 day), processing logic can determine that the caller phone is authorized to receive location information of the recipient phone. In this embodiment, if the recipient phone has been used in a predefined amount of time, processing logic can determine that the caller phone is not authorized to receive location information of the recipient phone. In some embodiments, the recipient phone or the processing logic can set a timer when the recipient phone is not in use and resets the timer upon being used. In some embodiments, the predefined amount of time is predefined by a user of the recipient phone, such as defined on the recipient phone, defined on a website of a service provider for the recipient phone, etc. For example, a user sets that the audible location trigger is set when the recipient phone has not been used for 2 days. In this example, if a user loses the recipient phone or the recipient phone is stolen but not used for 2 days, the audible location trigger will be set, and if the user places a phone call from a caller phone to the recipient phone, the caller phone will be authorized to receive location information of the recipient phone.

In another additional alternate embodiment, processing logic determines whether the caller phone is authorized to receive location information of the recipient phone based on a time parameter and the identity of the caller phone. In this embodiment, if the recipient phone has not made a phone call or communication request to the caller device in a predefined amount of time, processing logic can determine that caller phone is authorized to receive location information of the recipient phone. In this embodiment, if the recipient device has made a phone call or communication request (e.g., text message) to the caller phone in a predefined amount of time, processing logic can determine that the caller phone is not authorized to receive location information of the recipient phone. In some embodiments, the recipient phone, a wireless carrier associated with the wireless phone, or a telecommunications carrier associated with the recipient phone can set a timer when the recipient phone is not in use and resets the timer once the recipient device is used. For example, if a parent expects to receive a phone call in 4 hours from her child's cell phone, and the child does not call her parent from her cell phone within 4 hours, the audible location trigger is set, and the parent will be authorized to receive the location information of her child's cell phone upon calling her child's cell phone after the 4 hours have passed.

In another embodiment, processing logic determines whether the caller phone is authorized to receive location information of the recipient phone based on a group account, such as a family mobile phone plan or shared mobile phone plan. A user of the group account, such as the owner of the group account, can select which users within the group account are authorized to receive the location information of the recipient phone. If the caller phone is one of the authorized users in the group account associated with the recipient phone, processing logic can determine that the caller phone is authorized to receive location information of the recipient phone. If the caller phone is not one of the authorized users in the group account associated with the recipient phone, processing logic can determine that the caller phone is not authorized to receive location information of the recipient phone.

At block 330, processing logic obtains information about a current geographic location of the recipient phone. Processing logic can obtain the information about the current geographic location of the recipient phone from the recipient phone, from a global positioning system (GPS), from a location service, from the service provider of the recipient phone, etc. The information can include the latitude and/or longitude of the recipient phone, a street address location of the recipient phone, a landmark located proximate to the recipient phone, etc. If processing logic cannot obtain information about a current location of the recipient phone from the recipient phone, a location server, etc, then processing logic can obtain a last recorded location of the recipient phone and use the last recorded location as the current geographic location of the recipient phone. Processing logic may not be able to obtain the current geographic location of the recipient phone because the recipient phone is turned off, the recipient phone does not have a connection to a cell phone tower, etc. Processing logic can obtain the last recorded information for the recipient phone from a telecommunications carrier, from a service provider, from a memory, etc. In one embodiment, processing logic can obtain a log file of phone calls made and/or received by the mobile device and use the log file as the current geographic location to be audibly included in a caller tune.

At block 340, processing logic causes the information about the current geographic location of the recipient phone to be audibly included in a caller tune to the caller phone. In one embodiment, processing logic causes the information about the current geographic location of the recipient phone to be audibly included in a caller tune to the caller phone upon establishing an initial connection with the recipient phone. For example, if a user discovers that the user's mobile device was lost or stolen, the user can login to a website of the user's service provider and authorize a mobile device belonging to the user's spouse to receive information about the current geographic location of the user's mobile device. In this example, once the user places a phone call to the user's mobile device from the user's spouse's phone, he will hear the current geographic location of the user's mobile device once a connection between the phones has been establish. In another example, if a user lent her phone to her child, and the user was expecting her child to call her from location X in 4 hours, the user could provide this information and a contact phone number via a website of her service provider or by informing a representative of the service provider. If the user does not receive a call from her phone from location X in 4 hours and the user calls her phone from the contact phone number, the user will hear the geographic location of her phone (and therefore her child). In some embodiments, the location information is provided in written form (e.g., electronic message, text message, etc.) in addition to or instead of being provided audibly as a caller tune.

In one embodiment, processing logic causes information about the current geographic location of the recipient phone to be audibly included in a caller tune to the caller phone by relaying the caller tune to the caller phone. In an alternate embodiment, processing logic causes information about the current geographic location of the recipient phone to be audibly included in a caller tune to the caller phone by replacing a default caller tune associated with the caller phone with the information about the current geographic location of the recipient phone. In another embodiment, processing logic causes information about the current geographic location of the recipient phone to be audibly included in a caller tune to the caller phone by appending a default caller tune associated with the caller phone with the location information about the current geographic location of the recipient. For example, if a default caller tune associated with the caller phone audibly plays "ring ring," and the recipient phone is at location "XYZ," processing logic would cause the caller tune to audibly include "XYZ" as part of the caller tune played to the caller phone.

In some embodiments, in addition to causing the current geographic location of the recipient phone to be audibly included in the caller tune to the caller phone, processing logic further sends a written message that includes the current geographic location of the recipient phone to the caller phone. The written message can be an email, a text message, etc.

Figure 4:
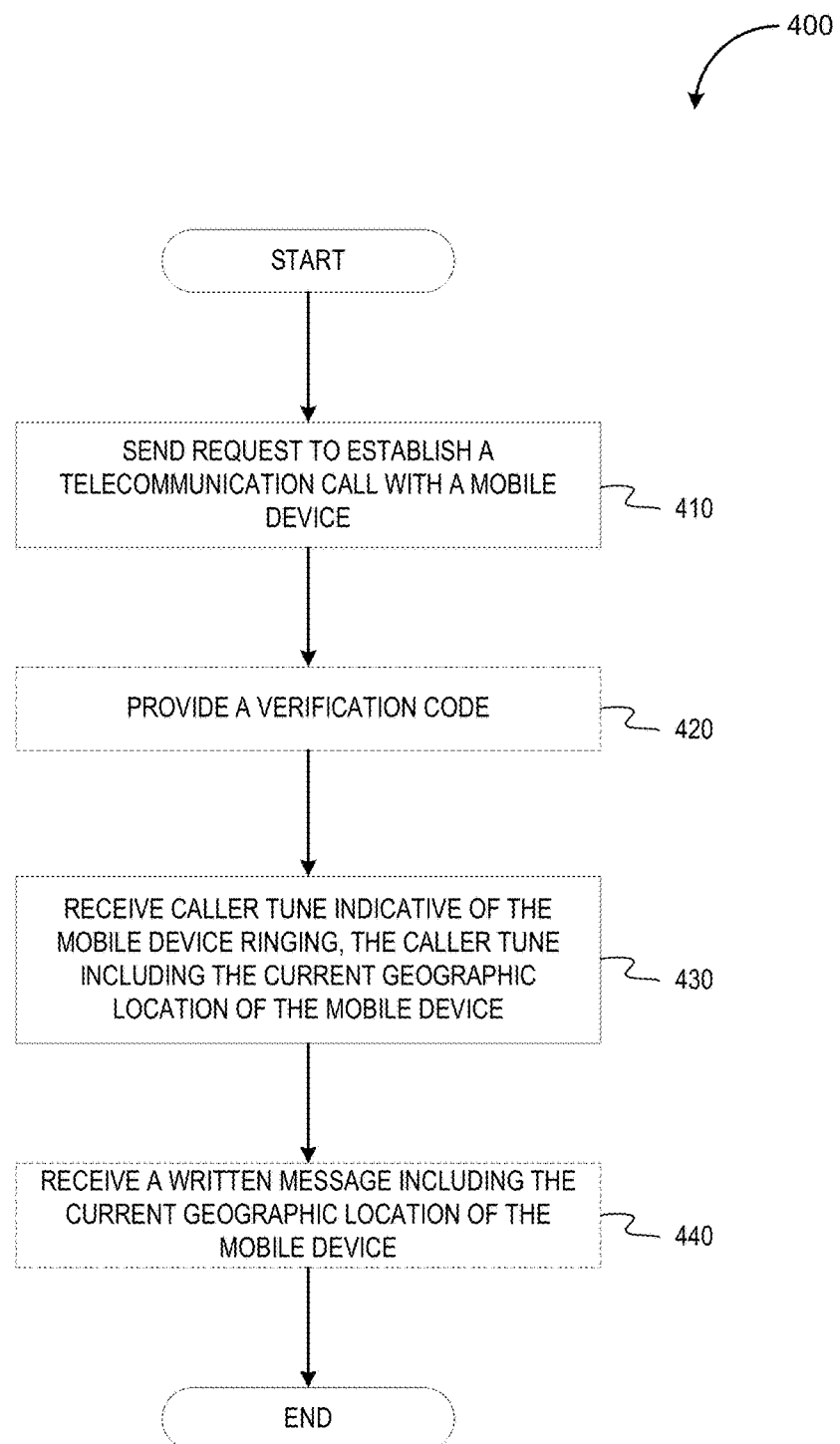
FIG. 4 is a flow diagram illustrating a method of receiving a location declaring caller tune, according to one embodiment.

FIG. 4 is a flow diagram illustrating a method of receiving a location declaring caller tune, according to one embodiment. The method 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 400 may be performed by a telecommunication system, a wireless provider, a wireless communication system, such as wireless communication system 210 illustrated in FIG. 2.

At block 410, processing logic sends a request to establish a telecommunication call with a mobile device. In one embodiment, processing logic sends the request by placing a phone call to the mobile device. In an alternate embodiment, processing logic sends the request by sending a communication request to the mobile device, such as by text message, electronic message, etc.

At optional block 420, processing logic provides a verification code. The verification code (e.g., passcode) can be a predetermined sequence of numbers, letters, keys, or other information that authorizes a caller phone to receive location information associated with the recipient phone. For example, the predetermined passcode can be "1234". The verification code can indicate that the processing logic is authorized to receive location information for the mobile device, such as a location of the mobile device, because the mobile device may have been lost, stolen, etc.

At block 430, processing logic receives a caller tune indicative of the mobile device ringing. The caller tune indicates the current geographic location of the mobile device. In one embodiment, the current geographic location of the mobile device is based on a global positioning system location of the mobile device. In other embodiments, the current geographic location of the mobile device is other location information of the mobile device, such as a landmark near the mobile device, a street address where the mobile device is located, a latitude and/or longitude of the location of the mobile device, etc.

At optional block 440, processing logic receives a written message including the current geographic location of the mobile device. The written message can be an email, a text message, etc and can indicate the current geographic location of the mobile device.

Figure 5:
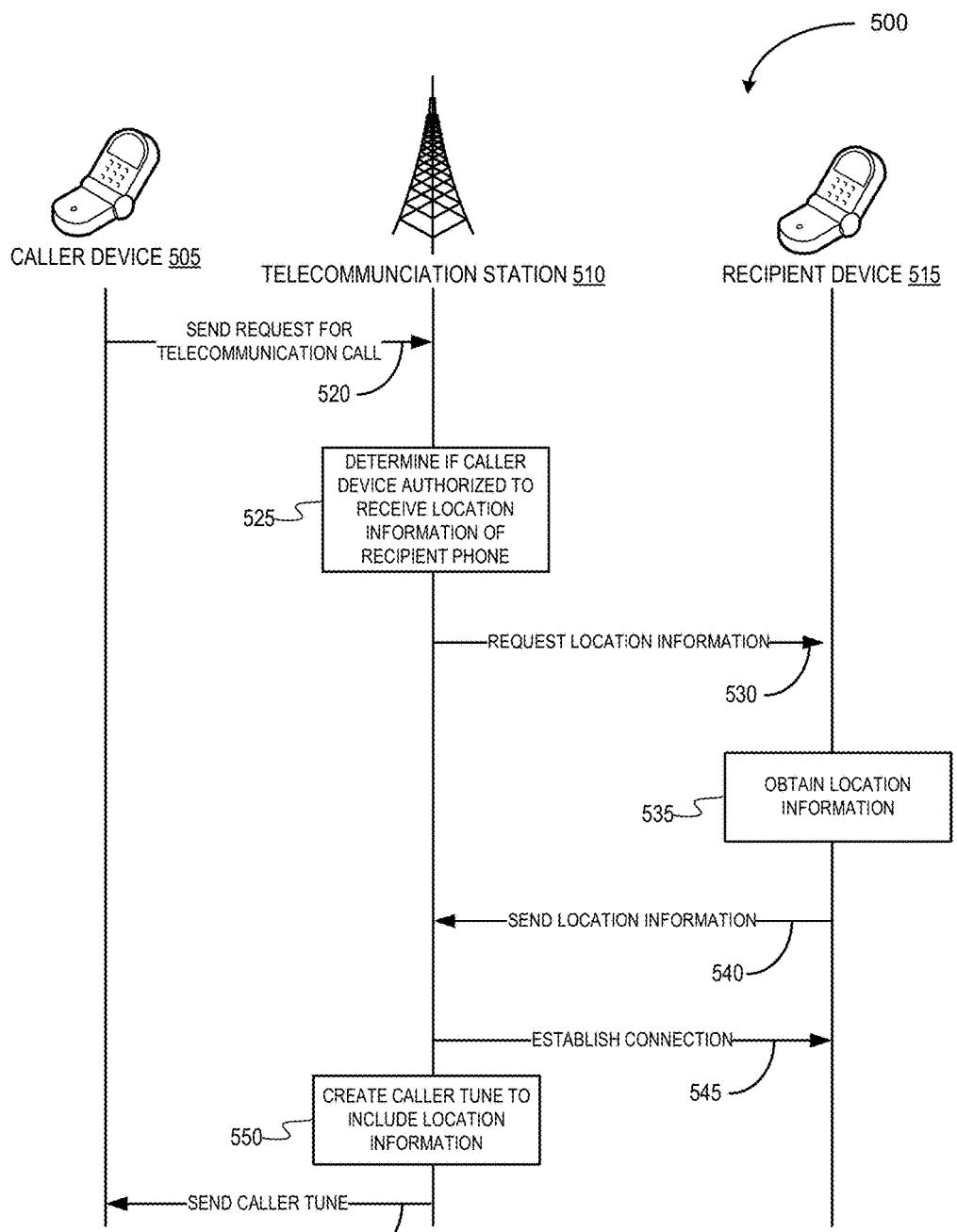
FIG. 5 is a timing diagram illustrating the timing of communications and actions performed by user devices and a telecommunication station, according to one embodiment

FIG. 5 is a timing diagram 500 illustrating the timing of communications and actions performed by a caller device 505, a telecommunication station 510, and a recipient device 515, according to one embodiment. At time 520, the caller device 605 sends a request for a telecommunication call 520 with a recipient device 515. The telecommunication station 510 receives the request for the telecommunication call 520. For example, a user of the caller device 505 places a call to a user of the recipient device 515, which generates the request for the telecommunication call. At time 525, the telecommunication station 510 can determine whether the caller device 505 is authorized to receive location information related to a current geographic location of the recipient device 515. For example, the telecommunication station 510 can determine that the caller device 505 is authorized to receive location information of the recipient phone 515 if the caller device 505 provides a predetermined verification code to the telecommunication system 510, if the caller device 505 is registered as an authorized user to receive the current geographic location of the recipient device 515, if the caller device 505 and the recipient device 515 are in the same group account of the telecommunication system 510, if the telecommunication system 510 determines that the recipient device 515 is lost or stolen, etc.

If the caller device 505 is authorized to receive the location information, the telecommunication station 510 can obtain location information of the recipient device by sending a request at time 530 for location information to the recipient device 515.

At time 535, in response to the request, the recipient device 515 obtains the location information for the recipient device 515. For example, the recipient device 515 can obtain the location information for the recipient device 515 from a GPS, from the telecommunication station 510 (based on the signal between the recipient device 515 and the telecommunication station 510), from a base station (not shown, using a multilateration of signals between base stations of a network and the recipient device 515), from a location service system, etc. The location information can include latitude and longitude information for the recipient device 515, a landmark located proximate to the recipient device 515, a street address of the recipient device 515, etc.

At time 540, the recipient device 515 sends the location information to the telecommunication station 510. At time 545, the telecommunication station 510 establishes an initial connection with the recipient device 515 based on the telecommunication call from the caller device 505. For example, the initial connection can indicate to the recipient device 515 that the caller device 505 has sent the request for the telecommunication call. In response to the initial connection being established between the telecommunication station 510 and the recipient device 515, the telecommunication station can create a caller tune at time 550 to provide to the caller device 505 to indicate that the recipient device 515 is ringing. If the caller device 505 was determined to be authorized to receive the location information of the recipient phone 515, the telecommunication station 510 can include the location information of the recipient device 515 as part of the caller tune. At time 555, the telecommunication station 510 can send the caller tune to the caller device 505, such that a user of the caller device 505 can hear the location information of the recipient device 515.

Figure 6:
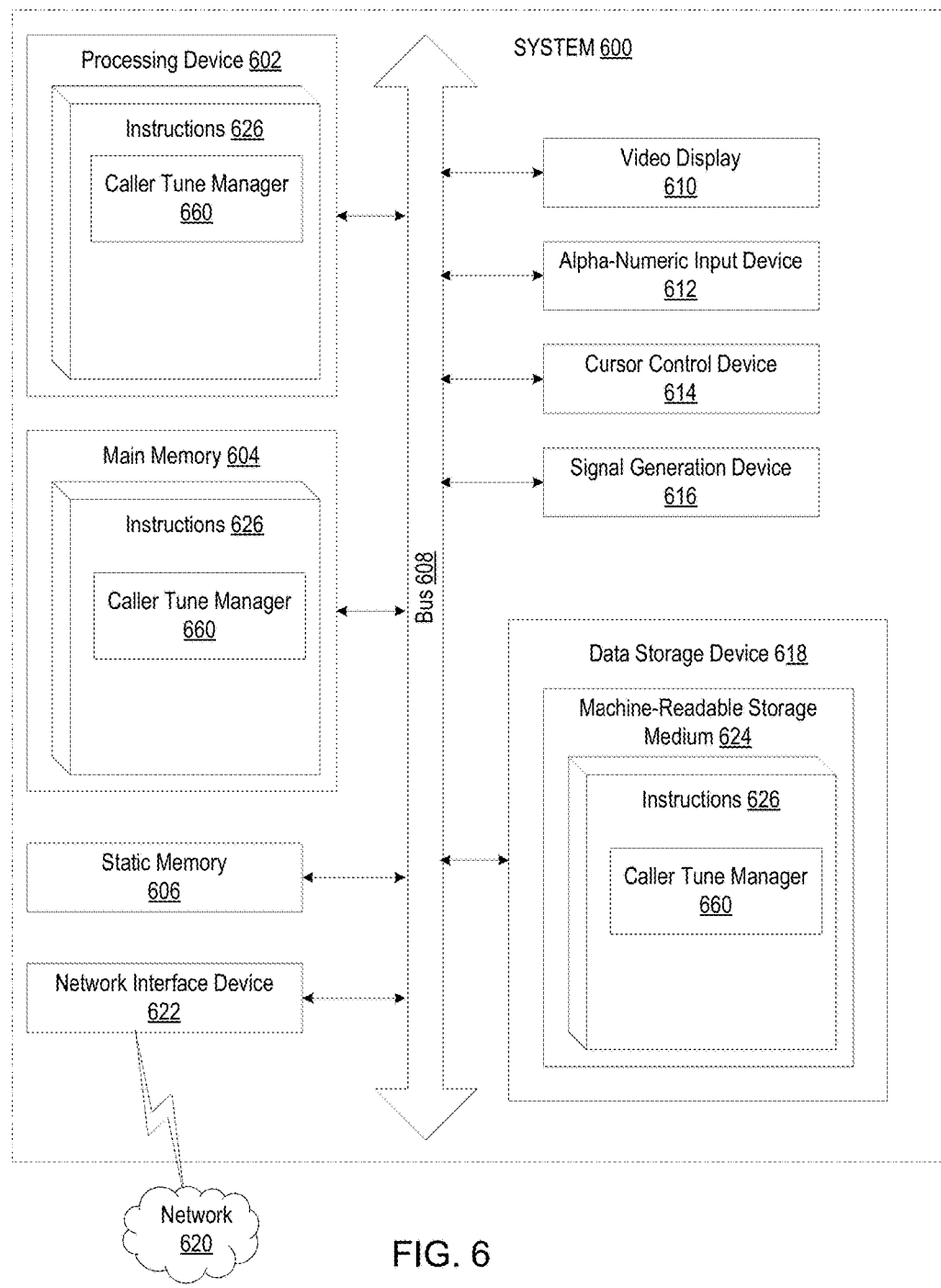
FIG. 6 is a block diagram illustrating an example of a computer system, according to one embodiment.

FIG. 6 illustrates a diagrammatic representation of a machine in the exemplary form of a computer system 600 within which a set of instructions, for causing the back-end server machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of wireless communication system 210 in FIG. 2.

The exemplary computer system 600 includes a processing system (processing device) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 624 on which is stored one or more sets of instructions 626 (e.g., instructions of caller tune manager 660) embodying any one or more of the methodologies or functions described herein. The instructions 626 may also reside, completely or at least partially, within the main memory 604 and/or within processing logic 626 of the processing device 602 during execution thereof by the computer system 600, the main memory 604 and the processing device 602 also constituting computer-readable media. The instructions may further be transmitted or received over a network 620 via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "receiving," "determining," "establishing," "evaluating," "applying," "identifying," "obtaining", "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The word "example" is used herein to mean serving as an example, instance, or illustration. Any aspect or design described herein as "example" is not necessarily to be construed as preferred or advantageous over other aspects or designs. Rather, use of the words "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a telecommunication system, a request from a first phone to receive information associated with a second phone;
   determining that at least a set amount of time has elapsed since the second phone communicated with the first phone;
   determining that the first phone is authorized to receive location information related to a current geographic location of the second phone responsive to determining that the set amount of time has elapsed;
   upon determining that the first phone is authorized to receive location information, determining the location information of the second phone comprising the current geographic location of the second phone;
   establishing at least an initial communication with the second phone;
   sending the location information of the second phone to the first phone to enable presentation of the location information of the second phone as audible information output by the first phone;
   after sending the location information, receiving updated location information from the second phone associated with the current geographic location; and
   sending the updated location information to the first phone.

2. The method of claim 1, wherein the request from the first phone to receive information associated with the second phone is received to locate the second phone when the second phone is lost or stolen.

3. The method of claim 1, wherein the request from the first phone to receive information associated with the second phone is received to monitor the current geographic location of the second phone, wherein the second phone belongs to a child, and wherein the first phone belongs to a parent of the child.

4. The method of claim 1, wherein the first phone is authorized to receive the location information in response to at least one of: a user of the first phone entering a verification code in association with the request to receive information associated with the second phone, the first phone being registered as an authorized user to receive the location information in relation to the second phone, the first phone and the second phone being within a same group account with respect to a telecommunications carrier associated with the first phone and the second phone, or the telecommunications carrier declaring that the second phone is lost or stolen.

5. The method of claim 1, wherein determining the location information of the second phone comprises determining a last recorded location when the second phone is turned off, when the second phone does not have a connection to a cell phone tower, or when the second phone cannot provide the location information of the second phone.

6. A computing system comprising:
   memory; and
   at least one processing device coupled to the memory, the at least one processing device to:
   receive a request from a first device to receive information associated with a second device; and
   upon establishing at least an initial communication with the second device, determine that at least a set amount of time has elapsed since the second device communicated with the first device, determine that the first device is authorized to receive location information related to a current geographic location of the second device responsive to determining that the set amount of time has elapsed, determine location information of the second device, the location information comprising the current geographic location of the second device, send the location information of the second device to the first device to enable presentation of the location information of the second device as audible information output by the first device, after sending the location information, receive updated location information from the second device associated with the current geographic location, and send the updated location information to the first device.

7. The computing system of claim 6, wherein the processing device further to verify that the first device is authorized to receive the location information of the second device, the processing device to at least one or more of:
   determine that a verification code was entered in association with the request to receive information associated with the second device,
   determine that the first device is registered as an authorized user to receive geographic information in relation to the second device,
   determine that the first device and the second device are within a same group account with respect to a telecommunications carrier associated with the first device and the second device, or
   determine that the second device is lost or stolen.

8. The computing system of claim 6, wherein the processing device is further to:
   receive an indication from a user of the second device that the second device is lost;
   place a lost status in association with the second device; and
   send the location information of the second device for any subsequent call made by any device.

9. The computing system of claim 6, wherein to obtain the current geographic location information, the processing device is to:
   send a request for the location information to a location system associated with the second device; and
   receive the location information from the location system.

10. A non-transitory computer-readable storage medium storing instructions which, when executed, cause a processing device to:

receive a request to from a first device to receive information associated with a second device;

determine that at least a set amount of time has elapsed since the second device communicated with the first device;

determine that the first device is authorized to receive location information related to a current geographic location of the second device responsive to determining that the set amount of time has elapsed;

determine location information associated with the second device, the location information comprising the current geographic location of the second device;

establish at least an initial communication with the second device;

send the location information of the second device to the first device to enable presentation of the location information of the second device as audible information output by first device;

after sending the location information, receive updated location information from the second device associated with the current geographic location; and send the updated location information to the first device.

11. The non-transitory computer-readable storage medium of claim 10, wherein the processing device to receive the last recorded location of the second device when the second device is turned off, when the second device does not have a connection to a cell phone tower, or when the second device cannot obtain the location information.

12. The non-transitory computer-readable storage medium of claim 10, wherein to verify that the first device is authorized to receive location information associated with the second device, the processing device is to determine whether a verification code was entered by a user of the first device in association with the request to receive information associated with the second device, determine whether the first device is registered as an authorized user to receive the location information in relation to the second device, determine whether the first device and the second device are within a same group account with respect to a telecommunications carrier associated with the first device and the second device, or determine whether the telecommunications carrier declared that the second device is lost or stolen.

* * * * *